United States Patent [19]
Monetti et al.

[11] Patent Number: 5,465,686
[45] Date of Patent: Nov. 14, 1995

[54] COLLAPSIBLE HOUSE FOR PETS

[76] Inventors: Steven A. Monetti; Catherine J. Monetti, both of 14 Crestwood Dr., Mountain Lakes, N.J. 07046

[21] Appl. No.: 305,592

[22] Filed: Sep. 14, 1994

[51] Int. Cl.⁶ ............................................. A01K 29/00
[52] U.S. Cl. ............................................. 119/168
[58] Field of Search ........................ 119/165, 168, 119/19

[56] References Cited

U.S. PATENT DOCUMENTS

| | | | |
|---|---|---|---|
| 4,792,082 | 12/1988 | Williamson | 119/168 X |
| 4,940,016 | 7/1990 | Heath | 119/168 |
| 5,014,649 | 5/1991 | Taft | 119/168 |
| 5,129,364 | 7/1992 | Pirkle | 119/168 X |

*Primary Examiner*—Paul J. Hirsch
*Assistant Examiner*—Thomas Price
*Attorney, Agent, or Firm*—Alfred C. Hill

[57] ABSTRACT

A disposable, collapsible pet house foldable from a unitary blank of material received in a flat state, the house being foldable from the blank between a collapsed state for shipping, storage and disposal and an enclosed, erect state for use, the house comprising a container portion having a bottom, a pair of oppositely opposed sidewalls extending upwardly from and integral with the bottom, and a pair of oppositely opposed end walls extending upwardly from and integral with the bottom, the pair of end walls being connected to the pair of sidewalls; a pair of sidewall panels, each integral with a different one of a pair of sidewalls; a pair of end wall panels, each integral with a different one of a pair of end walls, at least one of the pair of end wall panels having an opening therein for ingress and egress of a pet when the house is in the erect state; a pair of roof panels, each integral with a different one of the pair of sidewall panels, one of the pair of roof panels overlapping a portion of the other of the pair of roof panels when the house is in the erect state; and a releasable arrangement associated with each of the pair of roof panels and the pair of end wall panels to interconnect the same to provide the house with stability in the erect state; the pair of end wall panels and the other of the pair of roof panels and its associated one of the pair of sidewall panels being foldable into the container portion and the one of the pair of roof panels and its associated one of the pair of sidewall panels being foldable to cover the pair of end wall panels and the other of the pair of roof panels and its associated one of the pair of sidewall panels and extending over one of the pair of sidewalls and a portion of the bottom to be in an interlocking relation with the bottom when in the collapsed state.

15 Claims, 5 Drawing Sheets

COLLAPSIBLE HOUSE FOR PETS

BACKGROUND OF THE INVENTION

The present invention relates in general to the field of convertible enclosed box structures, or pet houses, used as an accessory for pets for such purposes as either a disposable, collapsible, enclosed pet litter-house, or as a disposable, collapsible, enclosed pet playhouse in which the pet may, for example, sleep, rest, seek shelter or shade, hide or play in and around. In particular, the present invention is directed to a simplified and efficient construction for such convertible, enclosed pet houses which enable the pet house to be formed from a single conventional corrugated board box blank, or similar material, with conventional box making equipment, and further reduces the blank waste making it more cost efficient to manufacture.

Many pet owners desire to provide one or both of the following two forms of accessories for their pets. The first accessory is an enclosed litter-house which allows the pet to dispose of its body waste within the owner's home. Although non-enclosed litter boxes are generally available, owners use enclosed litter-house structures because the enclosure provides the animal with privacy and it provides the owner with a mechanism for reducing the scattering of litter, containing odors and reducing the direct view of unsightly contaminated litter. The second accessory is an enclosed playhouse with at least one pet entrance. The playhouse provides a place for the pet to sleep, seek shelter or shade, hide, run in and out of, and frolic in and around. The owner will typically include some form of bedding material within the playhouse in order to add to the pet's comfort. From a structural viewpoint, these two accessories are the same. For a given enclosed pet house the difference in functionality arises wholly from the material placed within the pet house and its use is dictated by the marketing application. To further elaborate, when a litter type material is placed within a given enclosed pet house its application is that of a litter-house and when a bedding material (or possibly no material) is placed within the same enclosed pet house its application is that of a playhouse. In order to enhance the marketability of such pet houses inventors have endeavored to develop enclosed pet houses which are less costly to produce, ship and store, more convenient to use, easier and simpler to manufacture and assemble. To achieve these combined objectives, inventors have looked to optimize the design of such enclosed pet houses. In so doing inventors have introduced designs which are less complex, employ disposable material and are collapsible. In addition, inventors have made efforts to minimize the total amount of material used in the pet house's construction, the total number of different types of material employed in the pet house's construction as well as the number of independent parts required in the pet house's construction. These efforts have resulted in pet houses whose designs are extremely efficient, because desired features are added to such pet houses while costs associated with the material requirements, the manufacturing process and the assembly process continue to be reduced.

Consider the evolution of the enclosed litter-house structures. Initially, enclosed litter-house structures were made of plastic materials and the like and were big, bulky and costly. The major problem exists with them which is the distasteful and unsanitary job of changing the litter and cleaning the house. This periodic cleaning is a time consuming and messy process requiring that the spent litter material be removed, the house cleaned and new litter placed within the house. The cleaning process also requires o considerable care to avoid the inadvertent spilling of litter. In addition, this process increases the risk of contracting health problems from litter borne disease by the individual dumping the litter because considerable particulate matter becomes airborne as the solid litter is dumped. In order to eliminate these drawbacks and to make the accessory more convenient, disposable enclosed litter-houses have been developed. These disposable enclosed litter-houses are discarded when the litter material is contaminated and they are then replaced with a fresh unit with fresh litter. A drawback of such disposable, enclosed litter-houses were that their minimum dimensions are unacceptably large for them to be easily and inexpensively shipped, stored and disposed of. For these reasons, the ability to collapse such a structure has become highly desirable. Collapsible, disposable enclosed litter-house structures not only address the above concerns, but additionally, can be used as a containment vessel for the shipment of fresh litter. This further adds to the convenience of the accessory, by not requiring a user to separately purchase and add litter to the structure. There are numerous examples of such disposable, collapsible, enclosed box structures which function as a pet litter-house, as will be discussed herein below. These disposable, collapsible, enclosed litter-house structures are various attempts by inventors to increase design efficiency while reducing costs.

Considering the field of pet playhouse structures. One of the drawbacks associated with such structures is that they become malodorous after extended use by the pet. When this happens the pet tends to stop using the playhouse and the owner either discards it, or must go through a time consuming and messy process of cleaning and disinfecting the box structure. Another drawback of most playhouse structures is that they are of such a bulky configuration as to render storage, handling and shipping most difficult and costly. In order to alleviate these drawback playhouse structures have been made from disposable material, thus allowing them to be discarded and inexpensively replaced with a fresh unit when it's time for cleaning, or freshening up. Also, playhouse structures have been designed to be collapsible to eliminate the drawbacks introduced by bulky designs. The collapsible structure can also be used as a containment vessel for the shipment of pet bedding material to be employed in the playhouse. In addition, the collapsible structure lends itself to easy portability, which is a useful feature when an owner is traveling with their pet. Another difficulty with most playhouse structures is that they can not be readily assembled by the pet owner in a relatively short period of time and tend to require the use of special fixtures, tools, metal fasteners or clips which can become dislodged during use, thus presenting a safety hazard to small children, or the pet playing in the vicinity of the playhouse. Another drawback is that most playhouses of the kind indicated can not be readily disassembled, if desired, without there occurring damage to the house, thus, making the unit not especially well suited for transport or storage when not in use. Heretofore, playhouses have been designed to be bulky, unattractive, and not readily collapsible and portable. Various playhouses having collapsible and disposable features have not become popular in the market place, largely because of a complex nature, low reliability and high cost, and as a result preventing economic feasibility. There are numerous examples of structures functioning as playhouses that will be discussed herein below.

The evolution of disposable and collapsible designs of the aforementioned enclosed pet house structures not only lead to a more convenient, easier to ship and store product, but leads to a more cost effective product to produce from a manufacturing and assembly point of view.

In order to provide background information so that the invention may be completely understood and appreciated in its proper context, reference may be made to a number of prior art patents as follows:

(a) Enclosed prior art litter-house structures; U.S. Pat. Nos. 4,792,082; 4,919,078; 4,940,016; 4,986,217; 5,014,649; 5,046,457; 5,129,364; 5,167,205; and 5,178,100;

(b) Enclosed prior art playhouse structures; U.S. Pat. Nos.: 3,581,708; 4,177,761; 4,347,807; 4,391,223; 4,576,116; 4,803,952; 4,903,637; 5,050,536; 5,081,956; 5,099,794; 5,121,710; 5,148,768; and 5,282,439.

While all of the above referenced patents disclose an enclosed pet house structure that can function as either a disposable, collapsible enclosed pet litter-house, or as a pet playhouse, none of them achieves or fulfills the purposes of the present invention. Moreover none of these structures provide the benefits of simplicity, design efficiency and low cost to the extent realized by the present invention. Some are very expensive to manufacture while others are complicated in structure requiring numerous independent components. Others suffer from being difficult to assemble or unfold to its house or erect state. Other structures lack convenience and are difficult to collapse into their collapsed state. Some structures result in excessive wasted material when cut from standard blank material. Some structures have neither an integral self locking cover when in its collapsed state, or a bottom flap arrangement which is self locking thus requiring additional components, materials, manufacturing and assembly stages to seal and close the pet house structure. Some structures of the prior art don't lend themselves to being stored in a completely flat state at the box manufacturing plant while awaiting shipment to its final assembly point. Some structure are unstable while in their house or erect state, when moved, repositioned or transported as is common under normal operating situations.

Examination of the enclosed pet house prior art functioning as a playhouse it is found that U.S. Pat. Nos. 4,177,761; 4,347,807; 5,081,956; 5,099,794; 5,121,710; 5,148,768; and 5,282,439 disclose pet houses that are both complex and extremely costly to manufacture. They require numerous independent elements to be separately manufactured, and their assembly into a pet house is both complex and costly, requiring additional materials such as glues, clips, tapes, fasteners and the like to maintain the pet house in desired form. The pet houses are also constructed with costly permanent materials. Once erected these pet houses are not meant to be collapsed into a compact and easily stored mode when desired.

U.S. Pat. No. 3,581,708 discloses a compact pet house made of disposable material involving a roof section that is separate from the sidewalls and floor of the house, and wherein the roof section is glued in position to form the finished unit. The drawback of this structure is that it requires adhesives or glues for securing the various panels together representing a nuisance to the consumer, since the glues tended to be messy and susceptible to spillage. Also once the house is erected for the first time, it is difficult if not impossible to separate the unit later on, as required during storage or shipment. Any attempts to pull apart the glued pieces usually has a destructive effect on this structure.

U.S. Pat. No. 4,391,223 discloses the most progressive pet house found in the playhouse prior art. It represents a convertible box structure made of disposable material which is enclosed. The structure of patent '223 has several drawbacks. It requires separate and independent fasteners to secure the pet house in its erect state. These fasteners are easily lost or damaged and are difficult to install, thereby subtracting from the convenience of the structure. Additionally, the structure does not possess a storage state permitting the storage and shipment of either litter material or bedding material within the pet house until needed. Another drawback of this structure is that the original box blank is not efficiently employed when the pet house is stamped from its original rectangular blank. In fact, an excessive amount of blank waste is left, thereby making the box overly expensive. This structure also is of a bulky design and, therefore, does not lend itself to easy and inexpensive shipment and storage.

U.S. Pat. No. 4,576,116 discloses an enclosed pet house which is collapsible and portable which is not bulky and expensive to manufacture. It, however, lacks the capacity to function as a litter-house if demanded by the marketing application. It also possesses non-disposable components in its structure.

U.S. Pat. Nos. 4,803,952 and 5,050,536 disclose pet houses that are made of disposable materials, but they are still prohibitively costly and complex to manufacture and assemble. These structures require multiple independent components and don't lend themselves to easy and compact storage when not in use.

U.S. Pat. No. 4,903,637 discloses a pet house which is meant to be collapsed when desired, but it still possesses the drawback of the above cited patents. Namely, it is complex and costly to manufacture and assemble. The pet house of patent '637 requires multiple independent components and permanent materials are used in its construction.

Examination of enclosed pet houses of the prior art functioning as disposable, collapsible litter-houses disclose the following.

U.S. Pat. Nos. 4,919,078 and 5,129,364 disclose disposable, collapsible, enclosed pet houses which are not sufficiently elementary in design to permit rapid and predictable erection of the pet house. In addition, the structures of these patents are very complex and employ sophisticated production techniques that make them cost prohibitive.

U.S. Pat. No. 4,792,082 discloses a collapsible, disposable enclosed pet house utilizing only a single corrugated blank, or similarly stiff foldable material. However, the pet house of patent '082 requires the four corner panels 14, 21, 19 and 16 in FIG. 2 of the patent '082 to be adhered, The process of adhering four panels adds complexity and cost to the box manufacturing process. When these four panels are adhered in the box manufacturing process, which is customary in conventional box making plants, this creates a non-flat unit and, thus, prevents the box manufacturer from storing and then shipping the box structure to the point of assembly in a substantially flat state. An additional drawback is that it does not efficiently utilize the original blank from which the pet house is cut as seen by viewing FIG. 2 of the patent '082. In fact, the amount of waste is excessive and makes this pet house cost prohibitive. In addition, experiments show that when in its erect state front panel 3 and rear panel 4 fall from their erect position when the pet house is moved or repositioned during normal use. The reason for this is because tabs 35, 44, 45, and 37 do not remain engaged in their slots 34, 42, 43, and 36 when the roof panels 33 and 38 are disturbed during the process of repositioning the pet house. This reduces the convenience aspect of the structure. Further experiments show that the task of positioning panels 3 and 4 from their collapsed state to their erect state as illustrated in FIG. 4 of patent '082 is difficult, complicated and clumsy.

In particular, panel 4 is very difficult to place in its erect position because it lacks a mechanism to grasp or pull, while panel 3 is some what easier to position because the pet entryway may be used for grasping.

U.S. Pat. No. 4,940,016 discloses a pet house which by far is the best design encountered in the review of the related prior art. The structure is a collapsible, disposable, enclosed pet house formed from a single blank of corrugated board and uses the raw blank material more efficiently than the remainder of the prior art to achieve its functionality. When in its storage, shipping and disposal configuration as in FIG. 2 of patent '016, the pet house has a top member 30 which is an integral part of the design, but a drawback is that top member 30 does not provide a self locking means and, therefore, requires added materials and assembly stages to seal the box closed. An added drawback is that the bottom flap structure illustrated in FIG. 3 of patent '016 does not possess a self locking capability and, therefore, requiring an adhesive type of material to seal and to form bottom 16 as illustrated in patent '016. This increases both the material costs and stages to produce the pet house. Patent '016 also suffers from those same difficulties as U.S. Pat. Nos. 4,792, 082 and 5,014,649 in that the tabs 35, 37, 44, and 46 and slots 64, 66, 68, and 70 don't lock, and so the pet house becomes unstable, difficult, clumsy, inconvenient, an unpredictable when moved or repositioned during normal use. Additionally, experiments show that when the pet house is ready to be collapsed from its erect state shown in FIG. 1 of patent '016 to its collapsed state of FIG. 2, it requires the distasteful task of placing one's hand within the contaminated structure in order to withdraw tab 80 so that inner flap 56 maybe disengaged from top flap 62, thereby, reducing the devices appeal and convenience.

U.S. Pat. No. 4,986,217 discloses a simple pet house design, but its major drawback is that the pet house when in its erect state is relatively unstable and is subject to collapse during normal use. The mason for this is because it relies on friction between adjacent panels to maintain the sidewalls in their upright position. The sidewalls are subject to being easily collapsed inwardly by any external force applied thereto. A person, object or animal applying a force against the side, as is the case when repositioning or moving the pet house, can cause the sidewalls to easily fall inward. Additionally, the structure is of a two-piece design requiring a separate cover in order to keep the pet house sealed while in a collapsed state. This second component, the cover, only increases the cost both by requiting additional material and additional manufacturing stages. Another drawback is that the bottom flap configuration is not self locking, thereby requiring glue or tape and corresponding assembly stages to seal its bottom closed.

U.S. Pat. No. 5,014,649 discloses a pet house similar to the structure disclosed in U.S. Pat. No. 4,792,082, and it suffers from much the same drawbacks. Experiments show that end panels 36 become unstable from their erect position when the structure is moved or repositioned during normal use. This is because ears 60 don't remain engaged in slots 62 of FIG. 2 of patent '649. Additionally, the positioning of panels 36 from their storage and shipping state to their erect state illustrated in FIGS. 1 and 2 of patent '649 is difficult, complicated and clumsy process. An additional drawback is that three independent components must be manufactured and assembled, namely, top 16, bottom 12, and the enclosure 14 which leads to a complicated and costly box manufacturing process.

U.S. Pat. No. 5,046,457 discloses a pet house which may be shipped in a flattened state from the box manufacturer to the point of assembly. However, it does not offer the intermediate collapsed state which allows the placement and shipment of litter or bedding material in the pet house if deemed necessary for the marketing application. Since the pet house of patent '457 lacks an intermediate collapsed state, it suffers from the drawback of not collapsing to a closed compact form which provides ease of disposal and storage, a feature which is almost a requirement if the end user resides in an apartment, or where trash disposal containers are shared by many other residents. Additionally, the structure of patent '457 requires the end user to construct the container from a completely disassembled state, and, therefore, makes it less convenient to utilize.

U.S. Pat. No. 5,167,205 discloses a structure utilizing two corrugated or similarly stiff, foldable component parts to form its collapsible, disposable enclosed pet house. Experiments show that the upper floor layer 43 of the insert 31 and the lower floor layer 17 of the base 1 separate and pull away from each other when the pet house is repositioned or moved during normal use. This pulling away increases the chances for litter to spill because the device doesn't maintain its form. This makes the structure clumsy to move and reposition. Another drawback is that the two piece design makes the pet house more complicated and costly to manufacture, because the production requires multiple box stamping stages. Additionally, the structure lacks a self locking cover when in its collapsed state, thereby requiring additional material during the assembly phase to seal the pet house closed when in its collapsed state.

U.S. Pat. No. 5,178,100 discloses a pet house having a simple design and attempts to overcome some of the problems associated with U.S. Pat. No. 4,986,217. The drawbacks of the pet house of patent '100 is that the pet house in its erect state is relatively unstable. This is because the collapsible shell support structure 22 seen in FIG. 4 of patent '100 relies on friction between the bottom box portion 12 to remain in position. A sheer force, or a force against any of its side panels, will disengage this shell support structure 22 from the bottom and dislodge it from its erect state. Additionally, the pet house of patent '100 is very costly to manufacture because several independent manufacturing stages are required because several independent components must be constructed for the pet house. This pet house requires three separate components, namely, top portion 15, bottom portion 12, and side support 22, to be cut, glued and assembled during the manufacturing process.

Typically in the conventional box manufacturing process, box making equipment stamps out box forms from blank material and if the design includes glue tabs, the box making equipment joins the glue tabs in their appropriate position with some form of joining material or mechanism. The resultant component is then stacked, stored and made ready for shipment to the final assembly point. The final assembly point will receive all individual component parts of the product's design, dictated by the marketing application, combine and package them to form the final product intended for the consumer. Since the space required for each component is directly related to shipping and storage costs of the final product, minimizing the space required for each component is of utmost concern at all stages of product assembly and production. Thus, it is of utmost importance for the box design to allow the box manufacturing facility to store and then ship the pet house in a substantially flat state to the point of assembly. In the case when glue tabs are present in the structure's design, economics and technology dictate that the box manufacturer join and secure the glue tabs with an adhesive material or mechanism into their final positions prior to shipment to the point of assembly. Thus, it is of utmost importance for the box structure's design to simultaneously allow the glue tabs to be secured at the box manufacturing facility as well as allow the box manufacturing facility to store and then ship the box in a substantially flat state to the point of assembly. When this is accomplished by the structure's design, the space requirement is minimized for the box manufacturer in terms of storage and shipment. In this situation, since the box manufacturer has joined and secured the glue tabs, the only requirement at the point of assembly is to fold the pet house from its flat state into the configuration desired for consumer purchase. This configuration is that whereby a litter material or a bedding material is placed within the container and the container is collapsed and sealed. No joining or securing of glue tabs is required at the point of assembly.

Consequently, a need exists for an improved collapsible pet house formed from a single blank of material which can function either as a collapsible, disposable enclosed pet litter-house, or as an enclosed pet playhouse, which can be shipped from box manufacturer to assembler in a flattened state with no further adhesive application required at the point of assembly, which has an integral self locking cover when in its collapsed state which does not require additional adhesive material to seal the cover shut, which has a bottom flap configuration and structure which is self locking and sealing, reducing the materials required at the point of assembly and the number of stages required in the assembly process. The pet house must have an enclosed portion which is an integral part of the pet house, locking tabs on the enclosed portion so that when in its erect state, it is stable and the structural integrity of the unit is maintained when the pet house is repositioned or moved during normal use. The design of the pet house must be relatively inexpensive to manufacture. The design of the pet house must also minimize the manufacturing and assembly stages, possess more efficient and effective seals, use a minimum of space when in its flat state, be easy to assemble and use, and be easy to convert back and forth from its erect state and its collapsed state for shipping, storage and disposal. It also must use the original blank material more efficiently so it acquires all these features from a single blank of material.

SUMMARY OF THE INVENTION

An object of the present invention is to provide an improved convertible pet house which is capable of functioning either as an improved disposable pet litter-house or as an improved playhouse for pets depending on the choice of marketing applications.

Another object of the present invention is to provide a disposable pet house which is enclosed to prevent spillage of litter during its use as a disposable pet litter-house, or to provide a place of security and privacy during its use as a pet playhouse.

Still another object of the present invention is to provide a disposable, enclosed pet house which functions as a disposable, enclosed pet litter-house, or as a enclosed pet playhouse which is capable of easily and inexpensively being manufactured from a single blank of material, such as corrugated cardboard or some similarly stiff material.

A further object of the present invention is to provide a disposable, enclosed pet house which functions as a disposable, enclosed pet litter-house, or as a enclosed pet playhouse which is easily stored in a collapsible state, readily erected for use, and easily returned to its collapsible state for disposal or storage purposes.

Still another object of the present invention is to provide a disposable, enclosed pet house which functions as a disposable, enclosed pet litter-house, or as a enclosed pet playhouse which may be provided with its own litter material when functioning as a pet litter-house, or a bedding material when functioning as a pet playhouse. As a litter-house, the litter does not require removal therefrom for disposal. As a playhouse, the bedding material may be removed for cleaning, or replaced when it becomes malodorous or dirty. The pet house may also be provided with a moisture resistant bottom insert contained within the box structure.

Still a further object of the present invention is to provide a disposable, enclosed pet house which functions as a disposable, enclosed pet litter-house, or as a enclosed pet playhouse with an integral self locking and self sealing cover when in its collapsed state.

Another object of the present invention is to provide a disposable, enclosed pet house which functions as a disposable, enclosed pet litter-house, or as a enclosed pet playhouse with a bottom flap arrangement which is self locking and self sealing.

Another object of the present invention is to provide a disposable, enclosed pet o house which functions as a disposable, enclosed pet litter-house, or as a enclosed pet playhouse which may be shipped in a flattened state from the box manufacturer to the point of assembly with no further adhesive application required when at the point of assembly.

Still a further object of the present invention is to provide a disposable, enclosed pet house which functions as a disposable, enclosed pet litter-house, or as a enclosed pet playhouse which contains a locking tab and corresponding slot arrangement which secures the pet house in a stable position when in its erect state. This tab and slot arrangement prevents seams from separating, thereby preventing the pet house when in its erect state from losing shape and becoming undone, and thereby permitting the moving or repositioning of the pet house when in its erect state during normal use. This tab and slot arrangement is releasable and, thus, the pet house may be moved from its erect and collapsed states repeatedly to allow, for instance, cleaning or removal of bedding material, freshening of litter, partial removal of fecal matter and other service activities deemed necessary by the end user.

Still another object of the present invention is to provide a disposable, enclosed pet house which functions as a disposable, enclosed pet litter-house, or as a enclosed pet playhouse which is inexpensive enough in design to be replaceable by a fresh unit when used as a litter-house and the litter material is spent, or when used as a playhouse when the unit becomes malodorous, requires cleaning, or becomes stale.

A principle object of the present invention is to provide a convertible pet house and method of constructing the same with an efficient design which provides all of the aforementioned objects and yet provides a disposable, enclosed pet house which functions as a disposable, enclosed pet litter-house, or as a enclosed pet playhouse which is simple and inexpensive to manufacture utilizing standard box blank materials and box forming equipment, is simple and inexpensive to assemble requiting only the folding of creases and securing of tabs, is easy and convenient to use, is easily transported and portable, is easily and compactly stored when not in use, and is inexpensive enough to be replaceable by a fresh unit for all reason deemed necessary by the end user, thereby making it especially well adapted for commercial production, sale and of use by the consumer in the home.

A feature of the present invention is the provision of a disposable, collapsible pet house foldable from a unitary blank of material received in a flat state, the pet house being foldable from the blank between a collapsed state for shipping, storage and disposal and an enclosed, erect state for use, the pet house comprising a container portion having a bottom means, a pair of oppositely opposed sidewalls extending upwardly from and integral with the bottom means, and a pair of oppositely opposed end walls extending upwardly from and integral with the bottom means, the pair of end walls being connected to the pair of sidewalls; a pair of sidewall panels, each integral with a different one of the pair of sidewalls; a pair of end wall panels, each integral with a different one of the pair of end walls, at least one of the pair of end wall panels having an opening therein for ingress and egress of a pet when the house is in the erect state; a pair of roof panels, each integral with a different one of the pair of sidewall panels, one of the pair of roof panels overlapping a portion of the other of the pair of roof panels when the house is in the erect state; and releasable means associated with each of the pair of roof panels and the pair of end wall panels to interconnect the same to provide the house with stability in the erect state; the pair of end wall panels and the other of the pair of roof panels and its associated one of the pair of sidewall panels being foldable into the container portion and the one of the pair of roof panels and its associated one of the pair of sidewall panels being foldable to cover the pair of end wall panels and the other of the pair of roof panels and its associated one of the pair of sidewall panels and extending over one of the pair of sidewalls and a portion of the bottom means to be in an interlocking relation with the bottom means when in the collapsed state.

BRIEF DESCRIPTION OF THE DRAWING

Above-mentioned and other features and objects of the present invention will become more apparent by reference to the following description taken in conjunction with the accompanying drawing, in which.

DESCRIPTION OF THE PREFERRED EMBODIMENT

Figure 1:
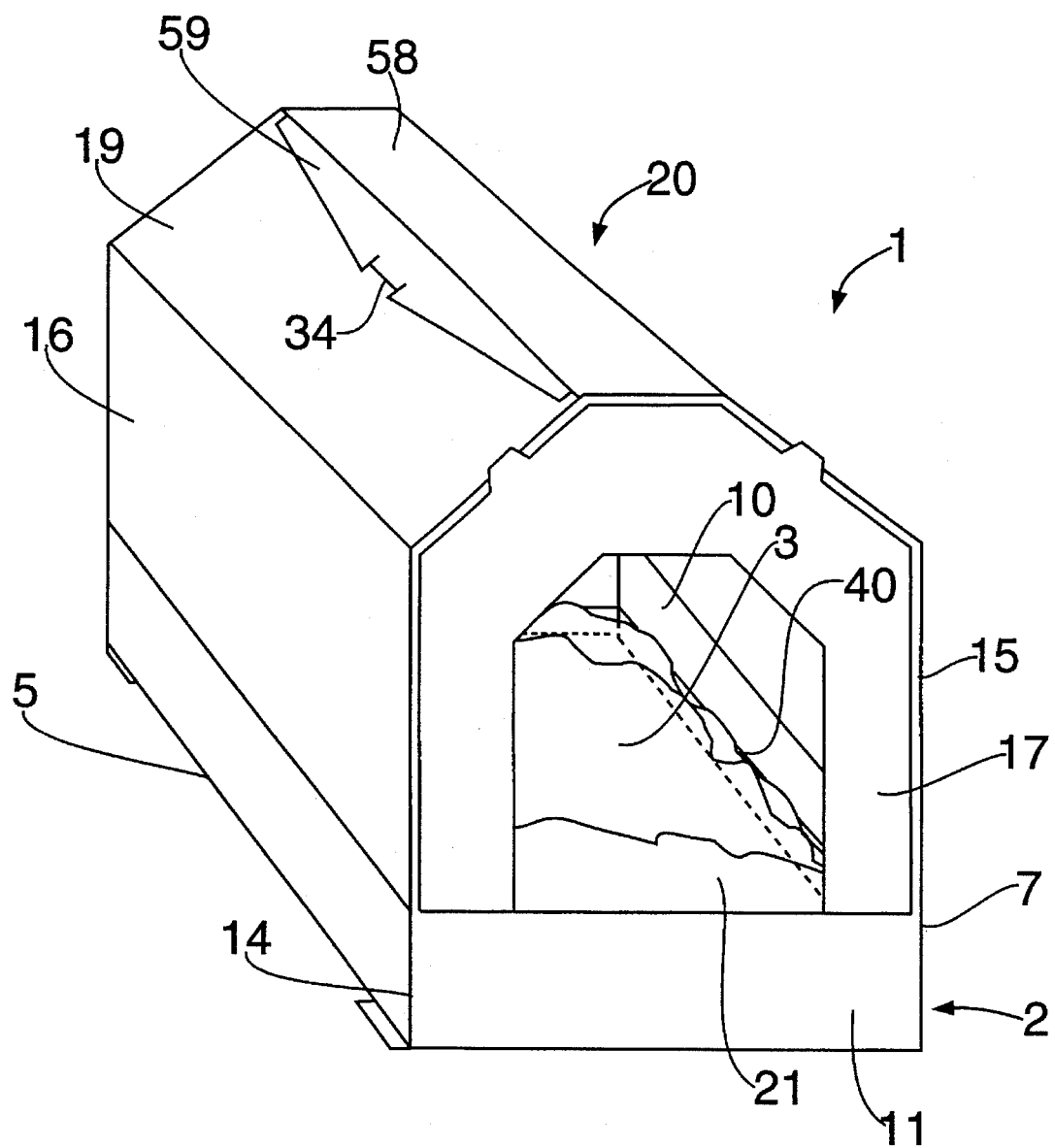
FIG. 1 is a front perspective view of the pet house in accordance with the principles of the present invention in its erect state.

Referring to FIGS. 1–7, in accordance with the principles of the present invention, the pet house 1 has three states. The first state is illustrated in FIG. 1 and is an erect state with the pet house 1 being either a pet litter-house, or a pet playhouse, depending upon the material 3 disposed within the container portion 2 thereof. If material 3 placed in container 2 is pet litter, the house 1 is employed as a pet litter-house. If the material 3 placed in container 2 is bedding material, the house 1 is then a pet playhouse. The end utilization whether a pet litter-house, or a pet playhouse depends upon the end use of the house 1.

Figure 3:
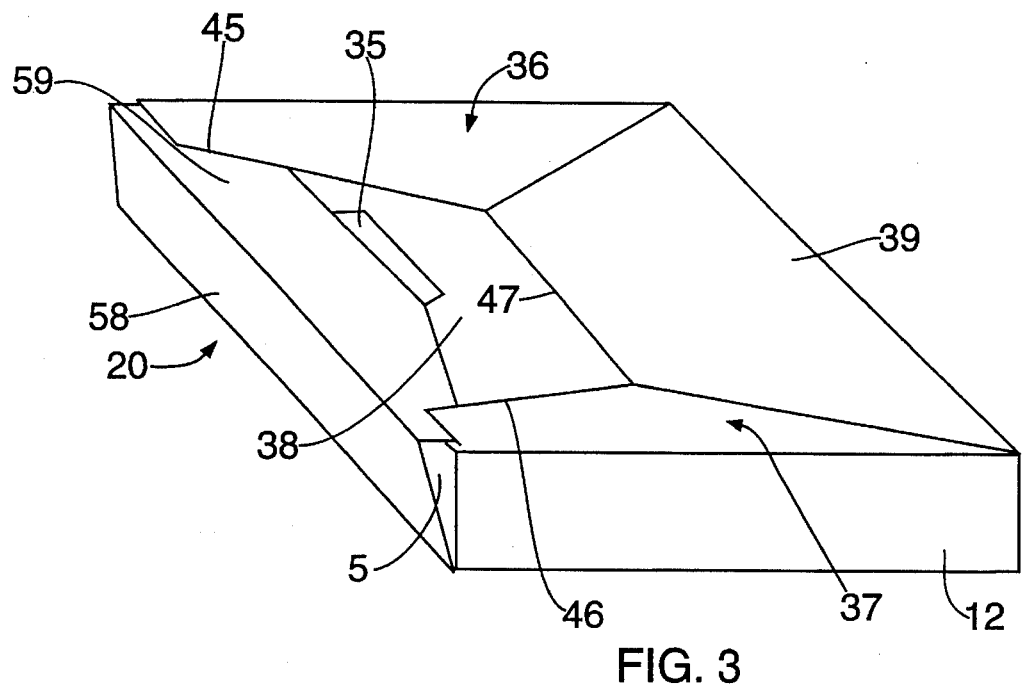
FIG. 3 is a perspective view looking at the bottom of the pet house in accordance with the principles of the present invention in its collapsed state with the locking top partially engaged in the bottom flaps.
Figure 4:
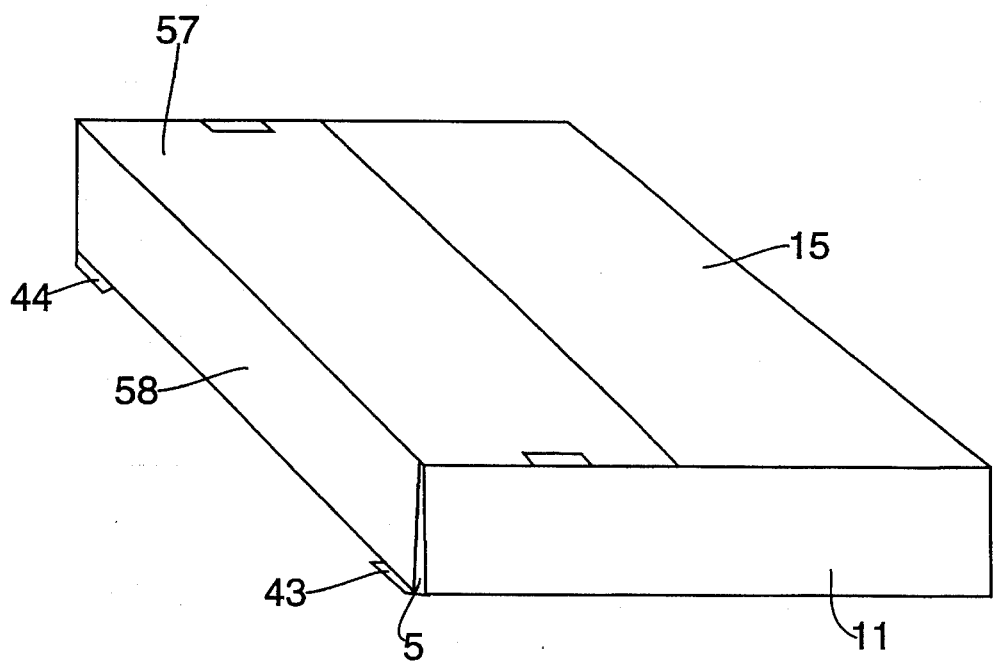
FIG. 4 is a perspective view looking at the top of the pet house in accordance with the principles of the present invention in its collapsed state with the locking top fully engaged in the bottom flaps.

The second state of the pet house 1 is shown in FIGS. 3 and 4 and is considered a collapsed state. In the collapsed state, the container 2 is completely enclosed and sealed so that it can be employed as a shipping container, a storage container or a disposal container so that the material 3 contained therein can be shipped, stored or disposed of without injuring the environment, requiring a lot of storage space and a lot of shipping space.

Figure 2:
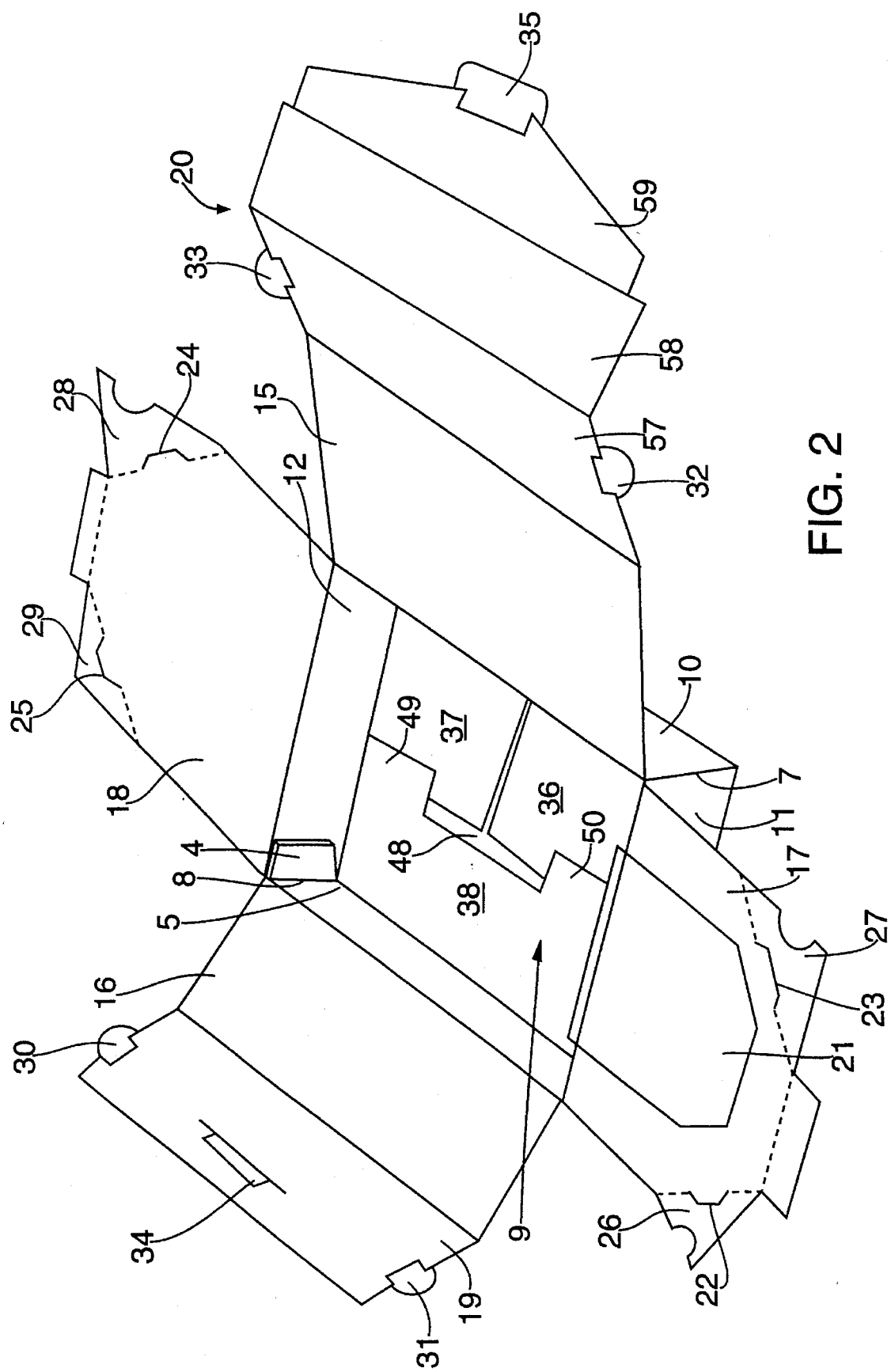
FIG. 2 is a perspective view of the pet house in accordance with the principles of the present invention in an intermediate state between its collapsed state and its erect state.
Figure 5:
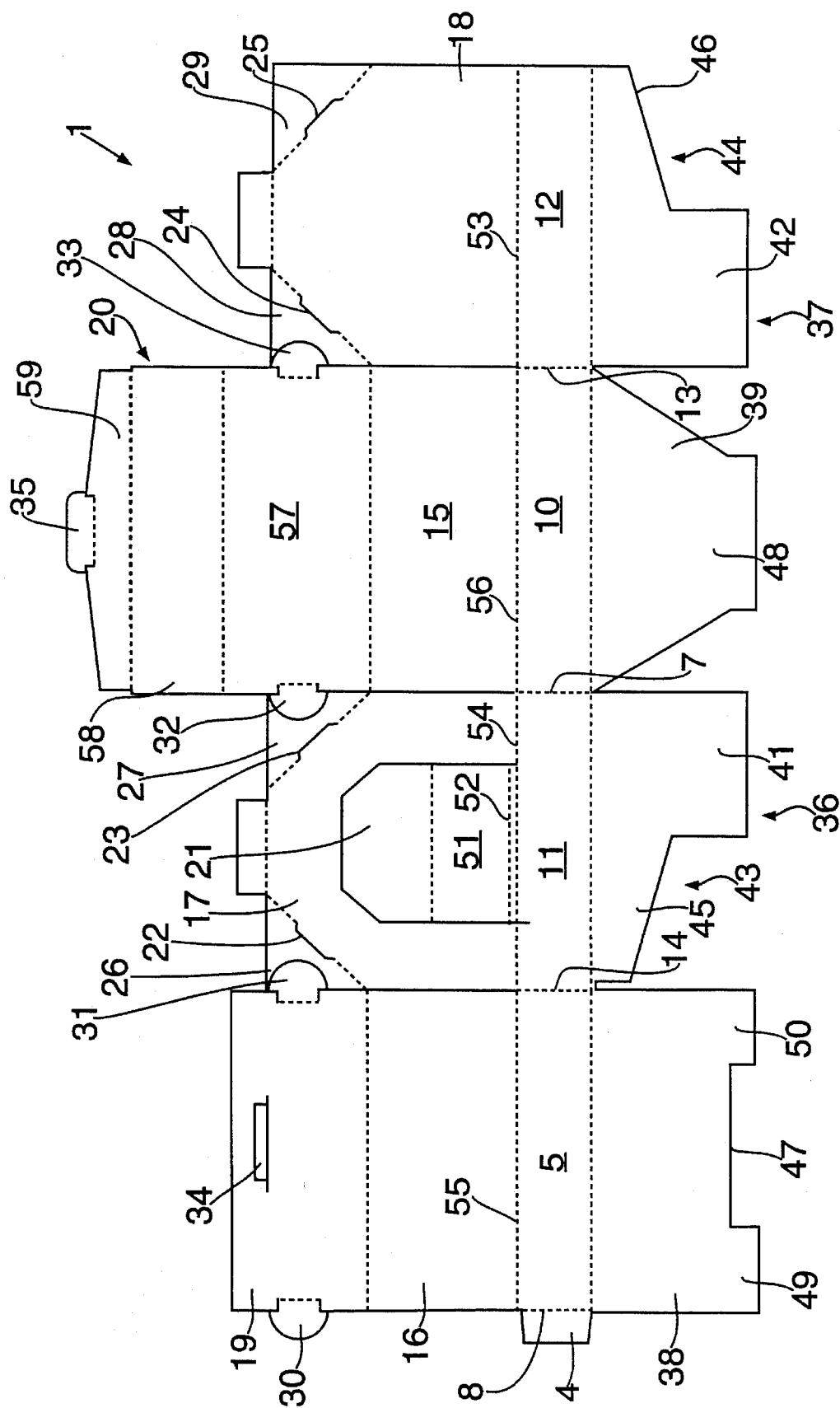
FIG. 5 is a plan view of a unitary blank of container material cut to form the pet house structure in accordance with the principles of the present invention.

Pet house 1 is folded from a flat material blank normally employed in box structures, such as corrugated cardboard or similar material. The flat blank is shown in FIG. 5 in which the solid lines therein indicate the panels employed in the pet house 1 with the broken lines therein representing the fold lines as will be discussed herein below. During the manufacturing process after the various panels and fold lines are provided in the blank, tab 4 integral with sidewall 5 is glued to end wall 12 as shown in FIG. 2. The blank of FIG. 5 is then folded on fold lines 7 and 8 to place the pet house 1 in its flat state. In this flat state, the pet house 1 is shipped to an assembly point for assembly into the collapsed state of the pet house 1 which then would be shipped to an end user either as a pet litter-house, or as a pet playhouse depending upon the material 3 contained in container 2.

In accordance with the principles of the present invention, the disposable, collapsible pet house 1 is foldable between the collapsed state of FIGS. 3 and 4 for shipping, storage and disposal and an enclosed, erect state as shown in FIG. 1. The pet house 1 includes a container portion 2 having a bottom 9 as more clearly illustrated in FIG. 2, a pair of oppositely opposed sidewalls 5 and 10 extending upwardly from and integral with the bottom 9 and a pair of oppositely opposed end walls 11 and 12 extending upwardly from and integral with the bottom 9. The pair of end walls 11 and 12 are connected to the pair of sidewalls 5 and 10 by fold lines 7, 13 and 14 as best seen in FIG. 5. The structure of pet house 1 is completed by having a pair of sidewall panels 15 and 16 each integral with a different one of the pair of sidewalls 5 and 10, a pair of end wall panels 17 and 18 each integral with a different one of the end walls 11 and 12, and a pair of roof panels 19 and 20 each integral with a different one of the pair of sidewall panels 15 and 16 with one of the pair of roof panels, namely, roof panel 20 overlapping a portion of the other of the pair of roof panels, namely, roof panel 19 when house 1 is in its erect state.

As shown in FIGS. 1, 2 and 5 one of the end wall panels, namely, end wall panel 17 has an opening 21 therein to provide an ingress and egress for a pet when house 1 is in its erect state. It would of course be possible to provide a similar opening in the other of the end wall panels.

Releasable means associated with each of the pair of roof panels and the pair of end wall panels are employed to interconnect the same to provide pet house 1 with stability in the erect state.

The releasable means includes a plurality of slots 22, 23, 24 and 25 disposed adjacent an edge of each of the pair of end wall panels 17 and 18 adjacent the top thereof. The slots 22, 23, 24 and 25 are provided in members 26, 27, 28 and 29 integral with the pair of end wall panels 17 and 18 and are folded inwardly when pet house 1 is placed in its erect state. Tabs 30, 31, 32 and 33 are provided on the roof panels 19 and 20 in an aligned relationship with the slots 22, 23, 24 and 25 to thereby engage these slots when pet house 1 is in its erect state. Roof panels 19 and 20 are interconnected by employing a slot 34 in roof panel 19 which is engaged when in its erect state by tab 35 on roof panel 20. The above-mentioned slots and tabs provide stability, strength and add to the tightness and snugness of the fitting of the components of pet house 1 when in its erect state.

Bottom 9 as illustrated in FIGS. 2 and 3 include a first pair of flaps 36 and 37 extending inwardly from and integral with an edge of a different one of the end walls 11 and 12 opposite an associated edge integral with the end wall panels 17 and 18 which is best seen in FIG. 2. A second pair of flaps 38 and 39 each extending inwardly from and integral with an edge of a different one of the pair of sidewalls 5 and 10 opposite an associated edge integral with the pair of sidewall panels 15 and 16. The flaps 36–39 provide an interlocking arrangement with one another to provide a self locking and sealed bottom for the container portion 2. A liner or insert 40 of moisture resistant material could be placed in the bottom of container 2 as best seen in FIG. 1 to prevent dampness from impregnating the board material when house 1 is employed as a pet litter-house. Alternatively, the board material forming the container 2 can be impregnated or coated with wax or similar material to make the board material substantially waterproof when employed as a pet litter-house.

The interlocking arrangement for the bottom 9 is provided by having a predetermined configuration for the flaps 36–39. More specifically, the flaps 36 and 37 contain a rectangular portion as illustrated at 41 and 42 in FIG. 5 with a second portion being provided as illustrated at 43 and 44 in FIG. 5 with an inclined edge 45 and 46 extending from a first point located approximately one half the distance from the edge of an associated one of the end walls 11 and 12 to a second point adjacent the edge of the associated one of the end walls 11 and 12. The length of rectangular portions 41 and 42 is equal to approximately one half the length of the sidewalls 5 and 10. Flap 38 is approximately one half the length of the end walls 11 and 12 and has a notch 47 therein as best seen in FIGS. 2 and 5. The configuration of flap 39 is substantially a truncated conical member having a length equal to one half the length of the end walls 11 and 12 and a width at the truncated portion 48 equal to the length of the notch 47 as best seen in FIG. 5. When flap 38 is folded inwardly to start the formation of bottom 9 and then flaps 36 and 37 are folded inwardly such that the rectangular portions 49 and 50 of flap 38 engage flaps 36 and 37 as best illustrated in FIG. 2. This is accomplished by a slight pressure on these three flaps, namely, flaps 36, 37 and 38. The flap 39 is positioned and folded in on top of flaps 36, 37 and 38 on the exterior of the bottom 9 and the truncated portion 48 is caused to engaged slot 47 in flap 38 so that there results an interlocked bottom which is also in a sealed condition so that any litter or bedding material can not spill out through the bottom 9. This engagement is accomplished by slight pressure on flap 39 until truncated portion 48 is caused to engage slot 47 in flap 38. This interlocking of the flaps 38 and 39 is best seen in FIG. 3.

The material 51 remaining in the opening 21 is folded along fold line 52 to a position within the container 2 to further lock the bottom 9 to prevent the interlocked arrangement thereof from becoming undone when in use.

During shipment, storage or disposal, the pet house in accordance with the principles of the present invention is placed in its collapsed state. This is accomplished by disconnecting the various tab and slot arrangements in the roof panels 19 and 20 and the end wall panels 17 and 18. After this disconnection of the interlocked arrangement the end wall panels 17 and 18 are folded along fold lines 53 and 54 into container 2 and then side wall panel 16 and roof panel 19 are folded along fold line 55 on top of the end wall panels 17 and 18. The sidewall panel 15 and the roof panel 20 are folded along fold line 56 and placed on top of the panels 16 and 19, and end wall panels 17 and 18 in such a manner that sidewall panel 15 and portion 57 of roof panel 20 covers the previously turned in panels. A portion 58 of roof panel 20 covers the sidewall 5 as illustrated in FIGS. 3 and 4 with the portion 59 of the roof panel 20 being inserted underneath the slanted portion of flaps 36 and 37 to provide an interlocking relationship between these components so that container 2 is completely enclosed as well as sealed for shipping, storage or disposal.

Figure 6:
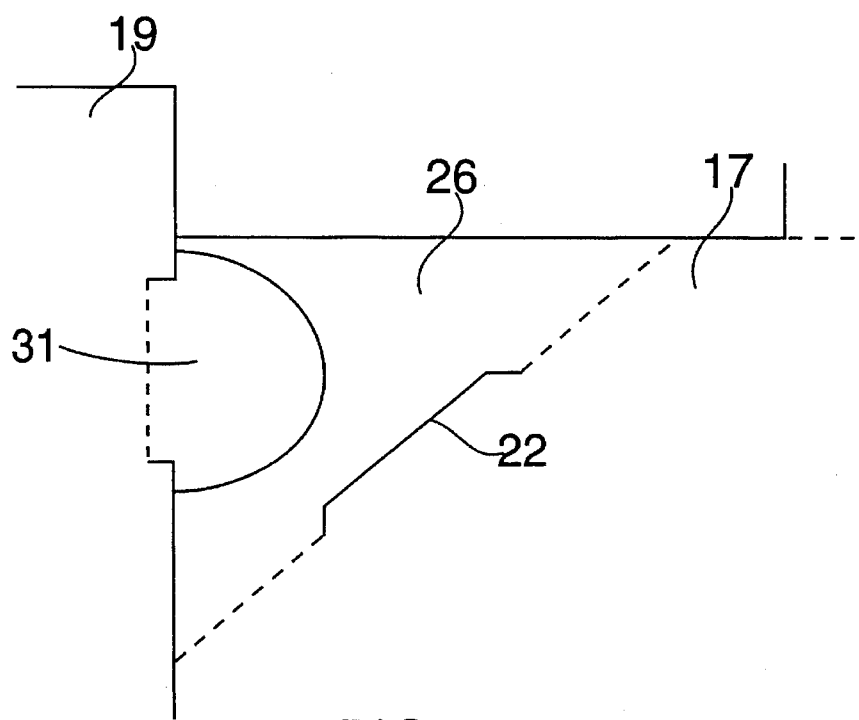
FIG. 6 is a detailed plan view of the locking tab and slot arrangement used to secure the roof panels to the end wall panels when the pet house is in its erect state.

Referring to FIG. 6, the manner of cutting the slots and the tabs for the interlocking connection between the roof panels and the end wall panels are clearly o illustrated in such a manner as to indicated the saving of material which is accomplished by the layout of the material used in the pet house in accordance with the principles of the present invention.

Figure 7:
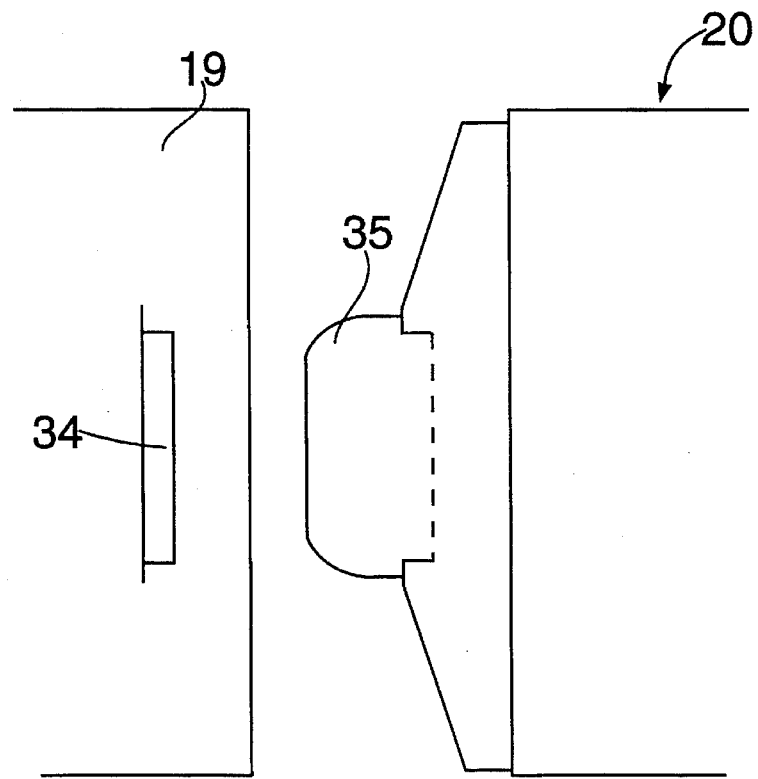
FIG. 7 is a detailed plan view of the roof locking tab and roof locking slot used to join the roof panels to form a stable, sturdy pet house when in the erect state.

FIG. 7 is an enlarged illustration of the relationship between the tab 35 in the roof portion 20 and the slot 34 in the roof portion 19.

While we have described above the principles of our invention in connection with specific apparatus, it is to be clearly understood that this description is made only by way of example and not as a limitation to the scope of our invention as set forth in the objects thereof and in the accompanying claims.

We claim:

1. A disposable, collapsible pet house foldable from a unitary blank of material received in a flat state, said house being foldable from said blank between a collapsed state for shipping, storage and disposal and an enclosed, erect state for use, said house comprising:

a container portion having
   a bottom means,
   a pair of oppositely opposed sidewalls extending upwardly from and integral with said bottom means, and
   a pair of oppositely opposed end walls extending upwardly from and integral with said bottom means, said pair of end walls being connected to said pair of sidewalls;

a pair of sidewall panels, each integral with a different one of said pair of sidewalls;

a pair of end wall panels, each integral with a different one of said pair of end walls, at least one of said pair of end wall panels having an opening therein for ingress and egress of a pet when said house is in said erect state;

a pair of roof panels, each integral with a different one of said pair of sidewall panels, one of said pair of roof panels overlapping a portion of the other of said pair of roof panels when said house is in said erect state; and releasable means associated with each of said pair of roof panels and said pair of end wall panels to interconnect the same to provide said house with stability in said erect state;

said pair of end wall panels and said other of said pair of roof panels and its associated one of said pair of sidewall panels being foldable into said container portion and said one of said pair of roof panels and its associated one of said pair of sidewall panels being foldable to cover said pair of end wall panels and said other of said pair of roof panels and its associated one of said pair of sidewall panels and extend over one of said pair of sidewalls and a portion of said bottom means to be in an interlocking relation with said bottom means when in said collapsed state.

2. A pet house according to claim 1, wherein
said bottom means includes
  a first pair of flaps each extending inwardly from and integral with an edge of a different one of said pair of end walls opposite an associated one of said pair of end wall panels, and
  a second pair of flaps each extending inwardly from and integral with an edge of a different one of said pair of sidewalls opposite an associated one of said pair of sidewall panels,
  said first and second pair of flaps each having a predetermined configuration to interlock with one another to provide a sealed bottom for said container portion.

3. A pet house according to claim 2, wherein
said predetermined configuration of each of said first pair of flaps includes
  a first portion rectangular in form having a first length substantially equal to one half the length of each of said pair of sidewalls, and
  a second portion integral with said first portion having an inclined edge extending from a first point located approximately one half the distance from said edge of an associated one of said pair of end walls to a second point adjacent said edge of said associated one of said pair of end walls,
said predetermined configuration of one of said second pair of flaps includes
  a third portion rectangular in form having a second length substantially equal to one half the length of each of said pair of end walls and a notch in an outer edge thereof having a given length and depth, and
said predetermined configuration of the other of said second pair of flaps includes
  a fourth portion having a truncated, conical form with a length equal to substantially said second length and a width at said truncated portion equal to said given length of said notch,
said sealed bottom being provided by folding said third portion and said first and second portions to have said third portion engage said first portions by material of said third portion adjacent said notch and to dispose said second portions outside of said third portion, said fourth portion being disposed outside of said first portions and engaging said notch of said third portion to interlock said first and second pair of flaps.

4. A pet house according to claim 3, further including
a portion of material in said at least one of said pair of end wall panels removed to provide said ingress and egress opening is folded into said container portion to further lock said sealed bottom in position.

5. A pet house according to claim 4, wherein
said releasable means includes
  a plurality of slots adjacent an edge of each of said pair of end wall panels contiguous a top thereof,
  a plurality of tabs adjacent an edge of each of said pair of roof panels to engage said plurality of slots,
  at least one slot in said other of said pair of roof panels, and
  an equal number of tabs in said one of said pair of roof panels to engage said at least one slot.

6. A pet house according to claim 5, wherein
said releasable means further includes
  a plurality of members integral with each of said pair of end wall panels folded inwardly, each of said plurality of members containing an associated one of said plurality of slots adjacent said edge of each of said pair of end wall panels.

7. A pet house according to claim 6, wherein
said one of said pair of roof panels is disposed in an interlocking relation between said second portions and said third portion in said collapsed state.

8. A pet house according to claim 5, wherein
said one of said pair of roof panels is disposed in an interlocking relation between said second portions and said third portion in said collapsed state.

9. A pet house according to claim 4, wherein
said one of said pair of roof panels is disposed in an interlocking relation between said second portions and said third portion in said collapsed state.

10. A pet house according to claim 3, wherein
said one of said pair of roof panels is disposed in an interlocking relation between said second portions and said third portion in said collapsed state.

11. A pet house according to claim 2, wherein
said one of said pair of roof panels is disposed in an interlocking relation between one of said second pair of flaps and both of said first pair of flaps in said collapsed state.

12. A pet house according to claim 2, wherein
said releasable means includes
  a plurality of slots adjacent an edge of each of said pair of end wall panels contiguous a top thereof,
  a plurality of tabs adjacent an edge of each of said pair of roof panels to engage said plurality of slots,
  at least one slot in said other of said pair of roof panels, and
  an equal number of tabs in said one of said pair of roof panels to engage said at least one slot.

13. A pet house according to claim 1, wherein
said releasable means includes
  a plurality of slots adjacent an edge of each of said pair of end wall panels contiguous a top thereof,
  a plurality of tabs adjacent an edge of each of said pair of roof panels to engage said plurality of slots,
  at least one slot in said other of said pair of roof panels, and
  an equal number of tabs in said one of said pair of roof panels to engage said at least one slot.

14. A pet house according to claim 1, further including
pet litter disposed in said container portion for shipping, storage and disposal thereof when said house is in said collapsed state and for an enclosed pet litter-house when said house is in said erect state.

15. A pet house according to claims 1, further including
bedding material disposed in said container portion for shipping, storage and disposal thereof when said house is in said collapsed state and for an enclosed structure for a pet to sleep, find shelter and play when said house is in said erect state.

* * * * *